UNITED STATES PATENT OFFICE.

ARNOLD ERLENBACH, OF DESSAU, GERMANY.

PREPARATION FOR DYEING HAIRS, FURS, AND THE LIKE.

1,144,325.  Specification of Letters Patent.  Patented June 22, 1915.

No Drawing.  Application filed February 21, 1913. Serial No. 749,692.

*To all whom it may concern:*

Be it known that I, ARNOLD ERLENBACH, a subject of the King of Bavaria, residing at Dessau, Germany, my post-office address being Schillerstrasse 5, Dessau, Germany, have invented certain new and useful Improvements in New Preparations for Dyeing Hairs, Furs, and the like, of which the following is a specification.

In U. S. Patent No. 1,105,554, dated July 28, 1914, I describe and claim new preparations for dyeing hairs, furs and the like, which are composed of an aromatic paradiamin containing besides the two amino groups an inorganic substituent, and of an aromatic meta-diamin which contains besides the two amino groups an oxyalkyl group. Now in the present application I claim as new preparations for dyeing hairs, furs and the like mixtures of aromatic paradiamins of the general formula:

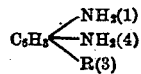

in which formula R means an organic substituent, such as an alkyl group, an oxyalkyl group or the like, with an aromatic meta-diamin of the general formula:

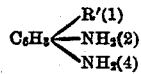

in which formula R′ means an oxyalkyl group, such as $OCH_3$ or $OC_2H_5$. The new preparations are most excellent dyes for hairs, furs and the like. They are to be used in combination with a suitable oxidizing agent, such as hydrogen peroxid. I obtain in this way fine black tints of a great stability.

The following examples may serve to illustrate my invention, the parts being by weight:

1. In order to prepare a new preparation for dyeing furs according to the present invention from para-toluylenediamin one may proceed as follows: A suitable quantity of para-toluylenediamin ($NH_2 : NH_2 : CH_3 = 1 : 4 : 3$) is converted into the sulfate, whereupon 108 parts of the sulfate thus obtained, after thoroughly grinding it, are thoroughly mixed together with 54 parts of the sulfate of meta-diaminoanisol, this sulfate also previously having been thoroughly ground. This mixture represents the new preparation and may be used for instance as follows: 10 parts of the new preparation above mentioned are dissolved in a suitable proportion of water whereupon 10 parts of a concentrated ammonium hydroxid (0.91 specific gravity) are added; the solution is then diluted with water whereupon 150 parts of hydrogen peroxid (of about 3% strength) are added, so that the whole mass represents 1,000 parts by weight. The furs which are to be dyed are previously well washed and then mordanted by introducing them in a mordanting bath which contains 5–10 parts of ferrous sulfate per 1000 parts of water, in which bath the furs remain over night. They are then well washed and brought into a dye-bath, the preparation of which is above given. After dyeing during about 8–10 hours the dyeing operation is finished, a deep and full bluish black being thus obtained. The furs are then thoroughly washed with water, dried and finished in the usual way.

2. A new preparation for dyeing furs may also be obtained from 2-methoxy-1.4-phenylenediamin ($NH_2 : NH_2 : OCH_3 = 1 : 4 : 2$); for this purpose 120 parts of this base are thoroughly mixed with 80 parts of 2.4-diaminoanisol, each of the two ingredients having been very well ground before mixing them. In order to prepare a dye-bath from this preparation 8 parts of it are dissolved in about 1000 parts of water whereupon 160 parts of hydrogenperoxid (about 3 per cent. strength) are added. The furs to be dyed are previously mordanted by introducing them into a bath which contains about 20 parts of the commercial pyrolignite of iron, (30 per cent.) The furs after remaining over night in this bath are squeezed without washing them and are then brought into the dye-bath as above prepared. The dyeing operation takes about 12 hours a dull blue-black being thus obtained; the furs are then well washed, dried and finished as usual.

It is obvious that my present invention is not limited to the above examples or to the details given therein. First may be stated that the proportions of the ingredients may be varied in order to obtain the best result; the special proportions of the respective para-diamin and meta-diamin depend to a great deal upon the desired shade and on the other hand upon the special nature of the hairs or the furs to be dyed.

Of course my new preparations may be offered to the trade either in solution or in the solid state. In applying the new preparations for dyeing furs and the like one may proceed according to the indications given in the above examples. If my new preparations are offered to the trade in solution these may be diluted with water to a suitable concentration and then a suitable oxidizing agent, such as hydrogenperoxid is added, thus giving a dye-bath ready for introducing the furs or the hairs to be dyed.

Having now described my invention and the manner in which it may be performed, what I claim is,—

1. As new compositions of matter new preparations for dyeing hairs, furs and the like, comprising an aromatic paradiamin of the general formula:

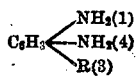

in which formula R means an organic substituent, and an aromatic meta-diamin of the general formula:

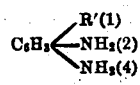

in which formula R' means an oxyalkyl group, which new preparations in the dry state when powdered form gray to black powders being rather soluble in water, and these new preparations producing on hairs, furs and the like in combination with an oxidizing agent black tints of a great stability.

2. As a new composition of matter, a new preparation for dyeing hairs, furs and the like comprising para-toluylene-diamin ($NH_2 : NH_2 : CH_3 = 1 : 4 : 3$) and meta-diaminoanisol which new composition is rather soluble in water and produces on hairs, furs and the like in combination with an oxidizing agent a deep and full bluish black of a great stability.

In testimony whereof I have hereunto set my hand in presence of two subscribing witnesses.

ARNOLD ERLENBACH.

Witnesses:
 RUDOLPH FRICKE,
 DORE KRAHL.